G. H. Corliss,
Rotary Steam Valve.
No. 24,618. Patented July 5, 1859.
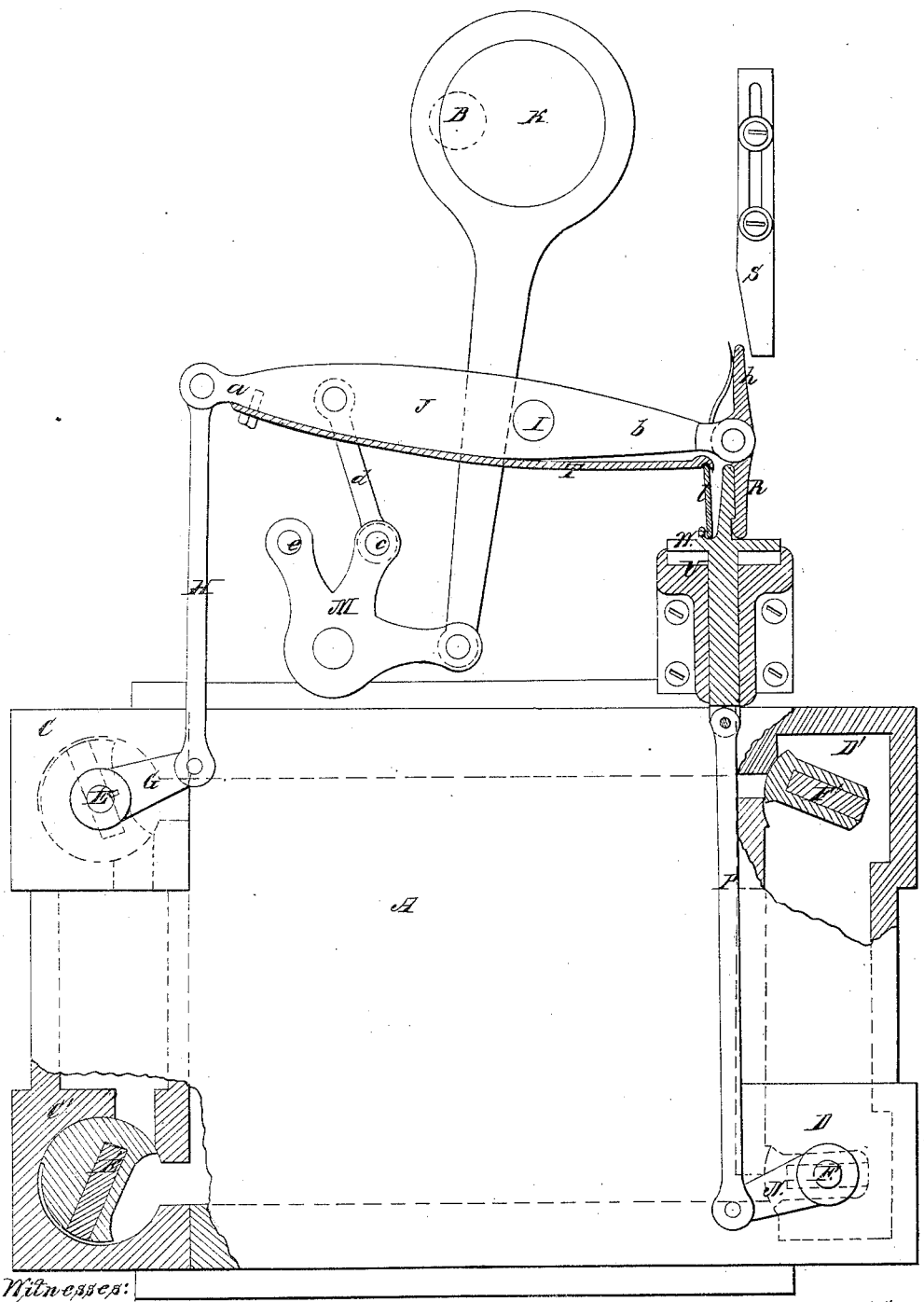
Witnesses:
William Corliss
W. L. Bermen
Inventor:
Geo H Corliss

UNITED STATES PATENT OFFICE.

GEO. H. CORLISS, OF PROVIDENCE, RHODE ISLAND.

STEAM-ENGINE.

Specification of Letters Patent No. 24,618, dated July 5, 1859.

*To all whom it may concern:*

Be it known that I, GEORGE H. CORLISS, of the city and county of Providence and State of Rhode Island, have invented certain new and useful Improvements in Steam-Engines, of which the following is a full, clear, and exact description, reference being had to the annexed drawing, which represents a view of certain parts of a direct-acting steam-engine with my improvements applied thereto.

My invention is applicable to steam engines that are provided with slide valves for opening and closing their steam ports, which valves are operated by being moved parallel to their seats and continue their closing movements after their ports are closed and commence their opening movements before their ports begin to open, and these valves are operated by mechanism which embodies two forces,—the one derived from the engine for their opening movements and the other derived from weights or springs for their closing movements; and as the valve apparatus is constructed with reference to an economical use of steam, a provision is made for varying the periods of closing the valves to accommodate the varying pressure of the steam in the boiler or the varying power required of the engine, and this is accomplished by liberating the valves from the control of their opening mechanism at varying periods of the strokes of the piston.

The object of my invention is to increase the efficiency and durability of an apparatus to be used for closing these liberated slide valves.

In a previous invention I introduced these valves in combination with a liberating valve gear, for the purpose of securing a more rapid movement of the valves at the periods of opening and closing their ports; and having found important advantages to result therefrom I have sought to attain a still greater rapidity of movement by the application of springs instead of weights, for closing the valves, and in so doing have found, that for closing the valve at a certain fixed point, say, after it has attained a full opening, a spring may be secured to some stationary part of the engine, and if its tension be properly proportioned to the resistance to be overcome, and a suitable provision is made for arresting the liberated mechanism after the valve is closed, a satisfactory operation is easily attained, but it is obvious that an earlier release of the valve will call the spring into action at a point when a diminished tensive force is developed, and that force will be found to be less and less, as the distance to which the valve is moved prior to liberation, is diminished, and the valve will not close with the requisite promptness, under such diminished power of the spring. And if on the other hand a spring secured to some stationary part of the engine be properly adapted to the conditions required by a limited opening of the valve, any change made to a wider opening will call for a readjustment of the parts, to equalize the varying forces which will be brought into action, not only from the spring itself but from the momentum which the parts acquire from being set in rapid motion by the spring. But by securing the spring for closing the valve to some portion of the valve gear wheel opens the valve, its position will be changed as the position of the valve changes, and while the same initial force may be obtained from the spring at every change in the period of closing the valves, the expansive force which it exerts varies with every change in the range of movement given to the valve, and the difficulties before mentioned will be surmounted. This constitutes the first part of my present invention. I have also devised a new and improved mode of applying a spring, for imparting to these valves their closing movements, which consists in securing it to a curved support, which support receives from the engine a movement corresponding with that of the mechanism used for opening the valves, and upon which support the spring acts as upon a variable fulcrum. The flexure of the spring is thus limited by the radius of the curve described by the surface of its support, and the bearing point is shifted along the spring as the latter is compressed.

My improvements are represented in the annexed drawing as applied to a direct acting steam engine, the cylinder A of which is located directly opposite the crank shaft B. The cylinder is fitted with four valves, which close four ports, the exhaust valves are situated in valve chests, C C', located upon one side of the cylinder, and the steam valves are situated in similar valve chests D D', located upon the opposite of the cylinder; in the drawing portions of two of the valve chests are removed to show the construction of the valves. The valves in this example are of the rotating variety, which I believe to be the best, and each is fitted with a rock shaft E, E', F, F', which extends through a suitable stuffing box in the head of its valve chest so that it may be turned to open and close the valve within the chest by the application of force to the shaft on the outside of the valve chest. The rock shafts of the steam and exhaust valves are in this example connected in pairs E F, and E', F', the two valves of each pair being opened by the same lever; as however the valve gear of the two pairs are alike, I have only represented the valve lever and connections of one pair (E F), and have omitted those of the other pair (E' F') to avoid complexity in the drawing. The rock shaft E of the exhaust valve is fitted with an arm G which is connected by a rod H with one arm $a$ of valve lever J, that is pivoted to a stationary fulcrum, I. This valve lever is caused to vibrate so as to open and close the exhaust valve by means of an eccentric K secured to the crank shaft of the engine, and operating in the present instance through the intervention of a wrist plate M, working in the manner described by me in my patents of March 10th, 1849, so as to impart but little movement to the valve when the port is closed. The valve lever J of one pair of valves is connected with one wrist pin $c$ of this wrist plate by means of a link $d$, and the valve lever of the other pair of valves is connected by a similar link with another wrist pin $e$ secured to the same wrist plate.

The rock shaft F of the steam valve is fitted with an arm N, to which a jointed rod P is applied, and is connected with the valve lever J; but instead of connecting this rod directly with the opposite arm $b$ of the valve lever J, it is connected therewith by means of a spring catch or latch R, so that the steam valve can at any part of its opening movement be disconnected from the valve lever by disconnecting the spring catch R. This disconnection is effected in the present example by acting upon the shank $h$ of the spring catch by means of an adjustable wedge formed stop S, which may be supported in any convenient manner and can be shifted to and fro in the direction of the line of motion of the catch so as to operate upon the latter and effect the disconnection of the steam valve after it has opened to any desired extent. The steam valve, after disconnection, is closed by means of a spring T which is secured to the edge of the valve lever nearer the steam valve rod P, so that the valve lever, which is a part of the valve gear by which the valve is opened, also forms the support of the spring T by which the valve is closed. The end of this spring which is nearer the valve rod acts upon it in opposition to the valve lever through the intervention of a bar $l$, which is inserted between the spring and rod, so that the moment the valve rod is disconnected from the valve lever by the operation of the stop S upon the spring catch R, the spring forces the rod from the lever and effects the rapid closing of the valve.

In order to prevent the jar that may arise from suddenly stopping the movement of the valve and its appurtenances at the instant of closing the valve, an air cushion is provided and applied in this instance to the rod P. This air cushion consists of a receptacle U to contain air, and of a piston W loosely fitted thereto and connected with the rod P; so that when the valve closes a quantity of air is caught in the air receptacle by the piston, and by its elasticity prevents any jar; as the piston is not fitted tightly to the receptacle, the air gradually escapes as the valve, after closing its port, is moved to its points of rest by the continued action of the spring.

When an engine having the above described valve gear applied to it is in operation, the movement of the arm $b$ of the valve lever J toward the steam valve chest strains the spring T until the spring catch connects the rod of the steam valve with the valve lever, when the spring is at the maximum degree of tension which it is required to exert to close the valve. The spring is thus strained while the valve is closed, and before it commences to open. As then the arm of the lever, with the rod of the steam valve connected with it, vibrates away from the steam valve chest, the steam valve is drawn open, and this opening movement continues until the spring catch is disconnected by the action of the adjustable stop S. During the connection of the valve with the lever the spring is constantly bearing against the rod in opposition to the opening movement by the action of the valve lever, and as the valve lever forms the support of the spring and thus moves in exact accordance with the opening of the valve, the spring is retained always at the same uniform tension whether the valve be opened partially or wholly; hence when the disconnection of the valve from the mechanism that opens it does take place, the initial force with which the spring tends to close it is always the same.

The edge of the valve lever to which the spring is secured is rounded, so that the spring in being strained is caused to apply itself to the rounded surface; and, as the spring is tangent to the surface, its bearing point, from which it tends to exert its force, is progressively shifted along the spring; hence the effective length of the spring, or its distance from the point of bearing to its point of application, varies with the tensive force which it exerts, being least when the tensive force is greatest, and the risk of setting the spring by continued bending at one part of its length is avoided.

I have thus described my improvements as applied in the best manner that I have devised, but they may be embodied in machinery differing in construction and arrangement from that I have described; my improvements may also be used wholly or partially as circumstances may render expedient. I have also represented and described my improvements as applied to an engine having rotating valves, but my invention is not limited to this variety of valves, but is applicable to all slide valves that may be closed with advantage by springs.

My improvements are applicable not only to steam engines, but also to all engines in which gas or vapor is used, in which valves operating substantially like steam slide valves are used. In the engine represented in the drawing the steam and exhaust valves are both moved by the same eccentric, the steam valves and exhaust valves may if desired be moved by separate eccentric or by other means without effecting the principle of my invention.

What I claim as my invention and desire to secure by Letters Patent is,

1. Imparting to the liberated slide valves of steam engines their closing movements by springs so connected with the valve gear that while these springs impart the same initial force to the valves at every operation the expansion force which these springs exert varies with every change in the range of movement given to the valves.

2. I also claim imparting to the liberated slide valves of steam engines their closing movements, by springs combined with a curved moving support, in such manner that the spring applies itself tangentially to the said support, and that the effective length of the spring varies with the tension force which it exerts.

GEO. H. CORLISS.

Witnesses:
WILLIAM CORLISS,
W. L. BENNEM.